Sept. 6, 1938.   R. A. DUFOUR ET AL   2,129,203
METHOD AND APPARATUS FOR HEAT TREATING METALLIC MEMBERS COATED WITH RUBBER Filed Sept. 16, 1936

INVENTORS:
RENE ALFONSE DUFOUR
& HENRI AUGUSTE LEDUC

ATTORNEYS

Patented Sept. 6, 1938

2,129,203

UNITED STATES PATENT OFFICE 2,129,203

METHOD AND APPARATUS FOR HEAT-TREATING METALLIC MEMBERS COATED WITH RUBBER

René Alphonse Dufour, Paris, and Henri Auguste Leduc, Mantes-Gassicourt, France

Application September 16, 1936, Serial No. 101,180
In Luxemburg, September 30, 1935

12 Claims. (Cl. 219—47)

This invention relates to methods and apparatus for heat-treating metallic members coated with rubber or the like and more particularly for vulcanizing the rubber-coating.

The main purpose of the invention is to provide methods and means for applying heat to the material under treatment at the desired rate throughout the mass of said material, which rate may be either uniform throughout said mass or, optionally intensified at certain points thereof. By these the time required for heat treatment is reduced to a minimum and a homogeneous finished product is ensured.

The principal feature of the invention consists in subjecting the metallic or electrically conducting member, coated or enveloped with a mass of rubber or the like, together with its adherent material to the action of an alternating electromagnetic field, preferably of high or relatively high frequency, under which action said member becomes heated by induction, the heat treatment being optionally effected in an autoclave.

A still further feature consists in utilizing, as a means of producing the alternating electro-magnetic field, electrical conductors located outside the mass of material to be treated and in close proximity of the same, said electrical conductors having a sufficient electrical resistance to become heated by the flow of electrical current and acting themselves as external heating means.

A still further feature consists in incorporating in the mass of rubber-material to be heat-treated substances of appreciable electrical conductivity for the purpose of generating heat within said mass under the action of eddy currents induced by the alternating magnetic field in said electrically-conductive substances.

A still further feature consists in applying to the metallic member which it is desired to coat with or envelop with rubber or any like material an initial underlying coat of inbaked hard rubber, the object of the hard rubber being to ensure perfect adherence of the exterior coating mass to the metallic surface and in then subjecting the aggregate to the heat treatment as above under such conditions that the major portion of the necessary heat will proceed from the metallic member itself.

Figure 1:
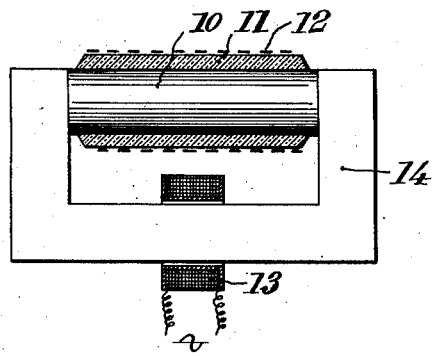
Figure 2:
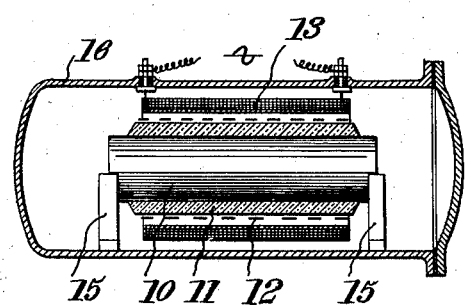

Further objects and advantages of the invention will appear from the following description, with reference to the accompanying drawing, in which:

Figs. 1 and 2 illustrate diagrammatically and partly in cross-section, two devices embodying one form of the invention.

The raw materials to be treated according to the invention consist of latex, gums, rubber cakes or sheets, regenerated or synthetic rubber or any other similar or equivalent material. In these raw materials are incorporated the ingredients commonly used in vulcanization, such as sulphur, plastifiers, accelerators or other products.

In the particular case of solid metallic cylinders, such as used in printing machines, which are to be coated with rubber, the operation may be conducted as follows, for example as shown in Figs. 1 and 2.

Heretofore, the rubber coating was generally vulcanized by introducing the metallic object, coated with rubber and wrapped with strips of fabric, in a steam autoclave. By this method the rubber, which is a poor conductor of heat, prevents the metal from being heated by the steam, so that the layers of rubber are less and less vulcanized from the outer layers towards the inner metallic core. The result is imperfect adherence of the rubber to the metal and irregular and insufficient vulcanization in the vicinity of the metallic core.

In accordance with this invention, these defects may be corrected by heating the metallic piece before or during the vulcanizing process, by subjecting the whole to the action of an alternating electro-magnetic field of high, medium or low frequency.

If the metallic core is heated by induction while the mass is being baked in an autoclave, the rubber is subjected simultaneously to heating from the interior, by the metallic core, and from the exterior by the heating fluid in the autoclave, so that a more uniform and more rapid heat treatment is obtained.

Inasmuch as the treatment, in this case, is effected in a closed vessel, the pressure of the medium surrounding the mass under treatment may be used to influence the treatment or to vary certain characteristics of the finished product. Thus, when a mixture of fluids, such as steam and air, is used, steam may serve as an external heating agent and air as a means of controlling the pressure under which the operation is conducted, greater cohesion of the rubber being obtained by operation under higher pressures.

When the heat treatment is effected in an autoclave, the rubber-coated part may be maintained under pressure while it is cooling, thus preventing the formation of blisters, either in case of accidental gaseous occlusions while the piece was being coated with rubber or of cells or cavities voluntarily incorporated in the mass and filled with a fluid under a pressure higher than atmospheric. It is evident that such blisters, which cannot form in cold rubber, are very detrimental and cause permanent distortions when the rubber is unmoulded or released from the pressure under which it was vulcanized while it is still hot.

To this end, the pressure of the surrounding gaseous medium, which may be air, is maintained while the cooling fluid, such as water, is introduced into the autoclave under a pressure equal or superior to that of the compressed gas, so that the vulcanized mass is maintained under the vulcanizing pressure, either by the compressed gas, or by the gas and cooling fluid together, or by the cooling fluid alone, until said vulcanized mass has been cooled to a temperature at which it may be safely removed from the autoclave.

It is evident that, in case the compressed gaseous fluid consists of a mixture of steam or another vapour, and air or another gas, it is essential, after the vulcanizing is terminated, to introduce into the autoclave together with the cooling water, a sufficient quantity of compressed air or gas to compensate for the drop in pressure due to the condensation of the vapour.

Fig. 1 shows by way of example an application of the invention in which a cylinder 10, which may be, for example, 2 metres long and 80 centimetres in diameter, has been prepared and coated with a layer of rubber 11, which latter may be soft, semi-hard or hard rubber. After the known practice, said rubber coating is first tightly wrapped with strips of fabric, the whole is then subjected, before baking, to a preliminary heating, either by introducing the said coated cylinder inside an induction coil fed with alternating current, so as to form a reactance coil of which said coated cylinder forms the core; or, as shown in Fig. 1, in providing said induction coil 13 with a laminated core 14, forming a U-shaped magnet between the poles of which is inserted the metallic cylinder 10 with its rubber coating 11. The current is adjusted to a value sufficient to bring the metallic cylinder 10 to a temperature of about 150° C. in about 10 minutes.

The rubber-coated cylinder, pre-heated in this manner, is then introduced into an autoclave in which it is treated after the known method. However, the duration of this treatment is very materially reduced as compared with the time required to vulcanize the same piece when the latter has not been pre-heated as above described. Furthermore, the vulcanization and the adherence of the rubber to the metallic surface are far more regular and uniform.

The operation may also be conducted as indicated in Fig. 2, by enclosing the induction coil 13, suitably insulated, within an autoclave. The cylinder 10 with its coating 11 to be vulcanized are then inserted within the coil 13 and suitably supported so that the metallic cylinder lies substantially in the centre of the coil 13. Alternating current is then passed through said coil, and the metallic core is heated by induction while steam is simultaneously admitted into the autoclave so that the rubber coating 11 is heated both from inside and from the outside thereof.

The speed of the vulcanizing process and the homogeneity of products obtained may further be considerably increased by utilizing as a conductor for the winding of the induction coil at least one metallic strip, which may preferably be a flat wire braid, the material thereof being chosen with electrical properties suitable not only to enable it to carry an electric current of sufficient frequency to cause the heating of the metallic core by induction, but also to constitute an electric heating resistance, which under the action of electric current, as for example that required to produce inductive heating of the core, will itself heat the rubber coating from the outside.

The above-mentioned electrical characteristics of the conductor may be chosen of such values that the rate of heating by resistance from the exterior may be higher than, equal to or lower than the rate of heating from the interior so that vulcanization will start first, or progress more rapidly, at will, on either the inner or the outer surface of the rubber coating, or will progress equally from both surfaces.

The operating method consisting in vulcanizing more rapidly one or the other of the surfaces of the rubber coating presents a considerable advantage in the case of metallic cylinders, or similar parts, coated with rubber; for in order to ensure perfect adherence between the rubber and the metal comprising the core, which may be of steel, for example, it is advantageous to interpose between said rubber coating and said metallic core a coat of hard rubber, the vulcanization of which is accompanied by a considerable shrinkage in volume. Hence if the coating of rubber proper be vulcanized first, as in the usual vulcanizing methods using steam as a heating agent, the rubber, on account of its new properties acquired by vulcanization, has considerable difficulty in following the shrinkage of the hard rubber when the latter itself becomes vulcanized.

A high outside pressure will nevertheless prevent the formation of cavities, blisters, blow holes and the like; but such high pressure is no longer necessary, at least in a large measure, when the vulcanization progresses from the hard rubber towards the exterior, as described in the above application of the invention, instead of in the reverse direction.

In the heating method described above, the metallic winding, whether composed of wire braid, or strips or otherwise, fulfills a double electrical function, since the current that passes through it is simultaneously inductive and heating. It is clear that said double function, instead of being fulfilled by an alternating current of given frequency and intensity, could be equally well fulfilled by successively or alternately using two different kinds of electric current, as for example, of different frequencies.

Thus, by way of example, a metallic cylinder coated with rubber may be rapidly heated to a temperature of the order of 150° C. by means of high-frequency current, even before the vulcanization process has started. Then a second phase of the process may be started by using medium or low frequency current, or even direct current, for the purpose of vulcanizing the rubber.

The winding of the induction coil may be formed of flat braided wire, or of ordinary wire of suitable resistance with asbestos or other insulation, or of metallic ribbon, or of any other suitable conductor. It may be set at a certain distance from the outer surface of the rubber, or in direct contact with the same. In the last case, the winding of said induction coil may serve as reinforcing for the fabric wrapping with which the rubber is wound, or even may replace said wrapping.

Electrically conductive particles, capable of becoming heated inductively when subjected to an alternating electro-magnetic field, may be incorporated in the rubber coating of said metallic cylinder, either uniformly throughout the mass of said rubber, or suitably distributed therein. The metallic cylinder may then be subjected, as hereabove described, to inductive heating.

In both cases, it is evident that the inductive treatment may be followed by the ordinary treatment in an autoclave.

The above heat treatment may be applied not only to printing press cylinders or similar parts but to all varieties of metallic parts to be coated with materials composed partly of rubber, such as, for example supports for floating-type motors, shock-absorbers, fabrics or carpets provisionally wound on a mandrel or the like.

By means of this invention, a heat treatment is obtained by very simple means, which heats the rubber or similar substances homogeneously, particularly in the case of masses of considerable thickness, the heating rate being practically independent of the dimensions of the mass under treatment.

On the contrary, in the methods of heat treatment used heretofore, heat was applied to the exterior of the mass and it was practically impossible to secure a uniform distribution of heat, for the outer surface was always overheated with respect to the central portion; or, if the outer surface was treated at the correct temperature, the centre of the mass was insufficiently treated.

It is evident that the invention is not limited to the embodiments herein described, but extends to all the variants thereof.

What we claim is:

1. A method of heat-treating a coating of rubber or similar materials surrounding a metallic member consisting in inserting said metallic member with its rubber coating in the magnetic circuit of an induction coil supplied with an alternating current, and inclosing said metallic member within an autoclave supplied with a heating fluid under pressure.

2. A method of heat-treating a coating of rubber or similar materials surrounding a metallic member consisting in inserting said metallic member with its rubber coating in the magnetic circuit of an induction coil supplied with an alternating current, in inclosing said metallic member within an autoclave supplied with a heating fluid under pressure, and when the heat treatment is completed, in admitting a cooling fluid under pressure within said autoclave maintaining the pressure in said autoclave during said cooling period at least equal to that maintained during said heat treatment.

3. A method of heat-treating a coating of rubber or similar material surrounding a metallic member comprising creating electric currents inductively in said member and thereby heating the member and the portions of the coating adjacent thereto, and heating the outside portions of said coating by means independent of the heating of said member.

4. In a method as in claim 3, the heating of said outside portions comprising the application of steam under pressure to said coating.

5. A method of vulcanizing a coating of rubber or other similar material to a metallic member which comprises creating electric currents inductively in said member and thereby heating the member and the portions of the coating adjacent thereto, and heating the outside portions of said coating by means independently of the heating of said member.

6. A method as in claim 3 in which both heatings are simultaneously applied to said coating.

7. A method as in claim 3 in which both heatings are simultaneously applied to said coating, the temperature of one of said heatings being varied during the heating process.

8. A method as in claim 3 in which the coating is first heated by said first named heating, and then heated by said second named heating in an autoclave.

9. A method as in claim 3 in which both heatings are applied to said coating while said coating is being subjected to pressure in an autoclave.

10. A method as in claim 3, said second named heating being supplied by an electric heating resistance subjected to an alternating current.

11. A method as in claim 3, said coating consisting of a layer of hard rubber adjacent said member, and an outside layer of soft rubber.

12. A method of vulcanizing a coating of rubber or similar material to a metal member which comprises first rapidly heating said member by means of a high frequency current to a relatively high temperature prior to the vulcanization of said coating, and then heating said member by means of a low frequency current during the vulcanization of said coating.

RENÉ ALPHONSE DUFOUR.
HENRI AUGUSTE LEDUC.